(12) United States Patent
Watanabe

(10) Patent No.: US 8,825,441 B2
(45) Date of Patent: Sep. 2, 2014

(54) INFORMATION PROCESSING APPARATUS AND TIME MEASUREMENT METHOD

(75) Inventor: Susumu Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1319 days.

(21) Appl. No.: 12/548,145

(22) Filed: Aug. 26, 2009

(65) Prior Publication Data

US 2009/0319816 A1 Dec. 24, 2009

Related U.S. Application Data

(63) Continuation of application No. PCT/JP2007/056698, filed on Mar. 28, 2007.

(51) Int. Cl.
G04F 3/06 (2006.01)
G06F 3/00 (2006.01)
G06F 3/01 (2006.01)
G06F 13/10 (2006.01)
G06F 1/14 (2006.01)
G06F 11/34 (2006.01)

(52) U.S. Cl.
CPC .............. G06F 1/14 (2013.01); G06F 11/3433 (2013.01); G06F 11/3419 (2013.01)
USPC ............ 702/176; 702/182; 702/183; 702/187

(58) Field of Classification Search
USPC ........... 702/81, 124, 127, 102, 140, 141, 155, 702/176, 182, 183, 187, 188; 380/212; 711/118; 714/14
See application file for complete search history.

(56) References Cited

U.S. PATENT DOCUMENTS

| | | | |
|---|---|---|---|
| 5,317,752 A * | 5/1994 | Jewett et al. | 714/14 |
| 5,732,240 A * | 3/1998 | Caccavale | 711/118 |
| 6,748,444 B1 * | 6/2004 | Nagashima | 709/236 |
| 7,046,805 B2 * | 5/2006 | Fitzhardinge et al. | 380/212 |

FOREIGN PATENT DOCUMENTS

| | | |
|---|---|---|
| JP | 08-212104 | 8/1996 |
| JP | 08-305631 | 11/1996 |
| JP | 09-185515 | 7/1997 |
| JP | A 10-253778 | 9/1998 |
| JP | 11-003323 | 1/1999 |
| JP | A 2001-156842 | 6/2001 |
| JP | A 2005-106696 | 4/2005 |
| JP | A 2005-222282 | 8/2005 |

OTHER PUBLICATIONS

Notice of Rejection mailed Apr. 24, 2012 (English translation enclosed) from corresponding Japanese Patent Application No. 2009-508768.

* cited by examiner

Primary Examiner — Jonathan C Teixeia Moffat
Assistant Examiner — Felix Suarez
(74) Attorney, Agent, or Firm — Greer Burns & Crain Ltd.

(57) ABSTRACT

An information processing apparatus includes a versatile Operating System (OS) that performs a time measurement process in response to a request from an application, a storage unit that stores a process load of the versatile OS and a delay time of the time measurement process in combination, a detecting unit that detects a process load of the versatile OS when the application requests the time measurement process, an acquiring unit that acquires a delay time that corresponds to the process load, which is detected by the detecting unit, as an expected delay time from the storage unit, and a requesting unit that requests the versatile OS to measure a requested measurement time that is obtained by subtracting the expected delay time, which is acquired by the acquiring unit, from a measurement time that is requested by the application.

20 Claims, 6 Drawing Sheets

FIG.3

| CPU LOAD [%] | AMOUNT OF FREE MEMORY [MB] | WRITING-OUT OF DATA FROM BUFFER | DELAY TIME [$\mu$s] |
|---|---|---|---|
| 86 | 0 | NO | 0.6 |
| 97 | 0 | YES | 1.5 |
| 98 | 1 | NO | 0.8 |
| ⋮ | | | |

FIG.6

| CPU LOAD [%] | AMOUNT OF FREE MEMORY [MB] | WRITING-OUT OF DATA FROM BUFFER | DELAY TIME [$\mu$s] |
|---|---|---|---|
| 86 | 0 | NO | 0.6 |
| 97 | 0 | YES | 1.5 |
| 100 | 0 | YES | 1.7 |
| 98 | 1 | NO | 0.8 |
| ⋮ | | | |

FIG.7

| CPU LOAD [%] | AMOUNT OF FREE MEMORY [MB] | WRITING-OUT OF DATA FROM BUFFER | DELAY TIME [$\mu$s] |
|---|---|---|---|
| 86 | 0 | NO | 0.6 |
| 97 | 0 | YES | 1.3 |
| 98 | 1 | NO | 0.8 |
| ⋮ | | | |

INFORMATION PROCESSING APPARATUS AND TIME MEASUREMENT METHOD

CROSS-REFERENCE TO RELATED APPLICATION(S)

This application is a continuation of PCT international application Ser. No. PCT/JP2007/056698 filed on Mar. 28, 2007 which designates the United States, the entire contents of which are incorporated herein by reference.

FIELD

The embodiment discussed herein is directed to an information processing apparatus which includes a versatile operating system (OS) that performs a time measurement process in response to a request from an application, a time measurement method, and a computer readable storage medium.

BACKGROUND

Information processing apparatuses, such as computers, sometimes measure time for, for example, time-out processing. The information processing apparatuses measure time by counting clock pulses from hardware that oscillates at a predetermined frequency. Specifically, an application that requires time measurement notifies an OS of its desired time to be measured. When the desired time elapses, the application is notified.

When time processing is performed in an information processing apparatus, the OS counts clock pulses in almost all cases. However, if the OS is a versatile OS that performs a plurality of processes simultaneously, time measurement may be delayed depending on the processing status of the versatile OS.

A technology is described in Japanese Laid-open Patent Publication No. 10-253778 in which a task waiting time corresponding to the processing status of a central processing unit (CPU) is added to a requested adjustment time and the timing of a clock device is adjusted accordingly. In this technology, the timing of the clock device can be accurately adjusted in consideration of any process delay that varies depending on the processing status of the versatile OS in the CPU.

When time is measured for, for example, time-out processing, any process delay needs to be taken into consideration before time is measured. Therefore, in the technology disclosed in Japanese Laid-open Patent Publication No. 10-253778, in which an adjustment time is corrected based on the actual process delay, the time is not accurately measured. For example, as represented in FIG. 1, if an application requests a versatile OS to measure a desired time, a delay time depending on the processing status of the versatile OS may be caused due to another process. In such a case, the desired time requested by the application is actually measured after the process load due to another process is reduced. This means that the application is notified that the desired time has elapsed at a timing that is delayed relative to the requested time for the delay time.

This means that in reality, if the application requests the versatile OS to measure, for example, three seconds in order to perform time-out processing after three seconds, the application is notified that the desired time (three seconds) has elapsed after, for example, 3.5 seconds due to a process delay in the versatile OS. In the technology disclosed in Japanese Laid-open Patent Publication No. 10-253778, the measured time is corrected based on the actual process delay. For this reason, although it is possible to notify the application that 3.5 seconds have elapsed since the request was made by the application, it is not possible to notify the application at three seconds that three seconds have elapsed since the request was made by the application.

To deal with the above problem, the versatile OS may be modified so that it becomes a dedicated OS that performs time measurement accurately. In this case, however, an advantage of the versatile OS, i.e., throughput enhancement is lost, and modifying and maintaining the OS increases costs.

SUMMARY

According to an aspect of the invention, an information processing apparatus includes a versatile Operating System (OS) that performs a time measurement process in response to a request from an application, a storage unit that stores a process load of the versatile OS and a delay time of the time measurement process in combination, a detecting unit that detects a process load of the versatile OS when the application requests the time measurement process, an acquiring unit that acquires a delay time that corresponds to the process load, which is detected by the detecting unit, as an expected delay time from the storage unit, and a requesting unit that requests the versatile OS to measure a requested measurement time that is obtained by subtracting the expected delay time, which is acquired by the acquiring unit, from a measurement time that is requested by the application.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a table of an example of combinations of process load and delay according to the embodiment;

FIG. 6 is a table representing an example of delay time registration according to the embodiment; and FIG. 7 is a table representing an example of delay time update according to the embodiment.

DESCRIPTION OF EMBODIMENT

A preferred embodiment of the present invention will be explained with reference to the accompanying drawings. In the embodiment, a delay time, which corresponds to a process load of a versatile OS, in time measurement is recorded. An application requests the versatile OS to measure a time that is obtained by subtracting from a desired time the previous delay time corresponding to a load equivalent to that of the versatile OS.

Figure 1:
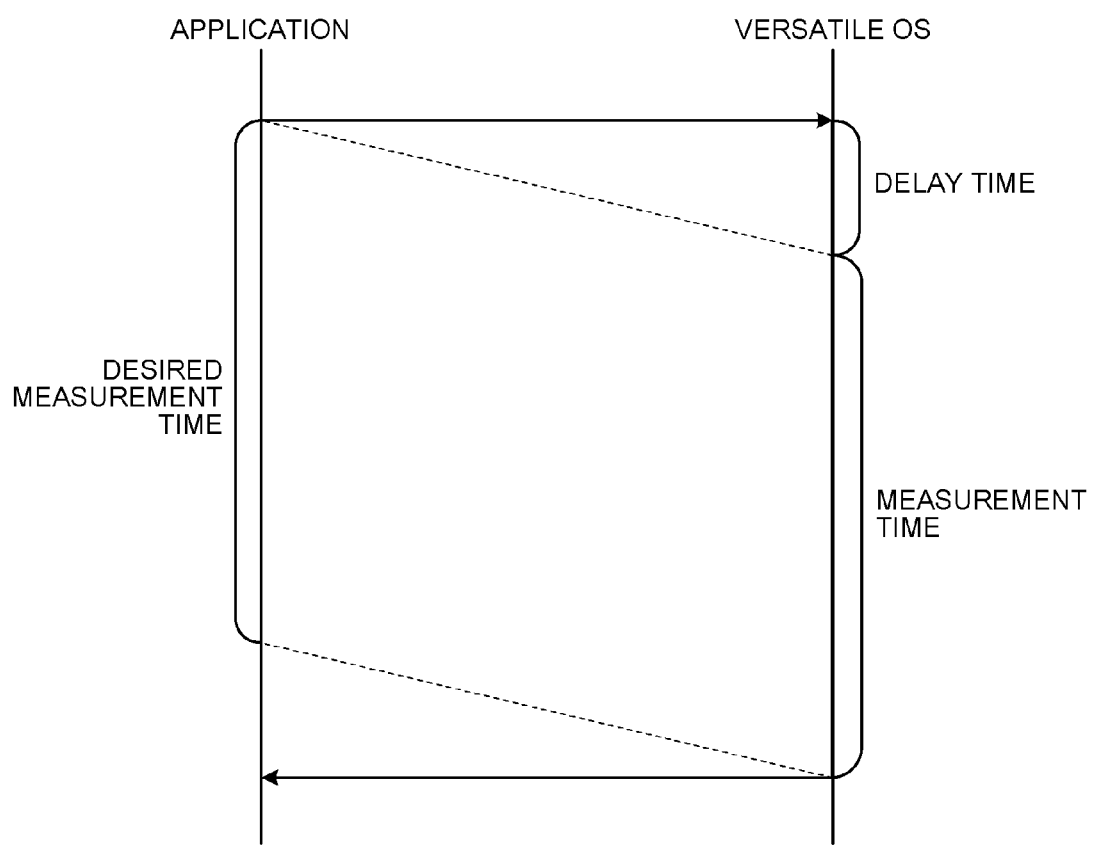
FIG. 1 is a diagram representing an example of a delay in time measurement by a versatile OS.
Figure 2:
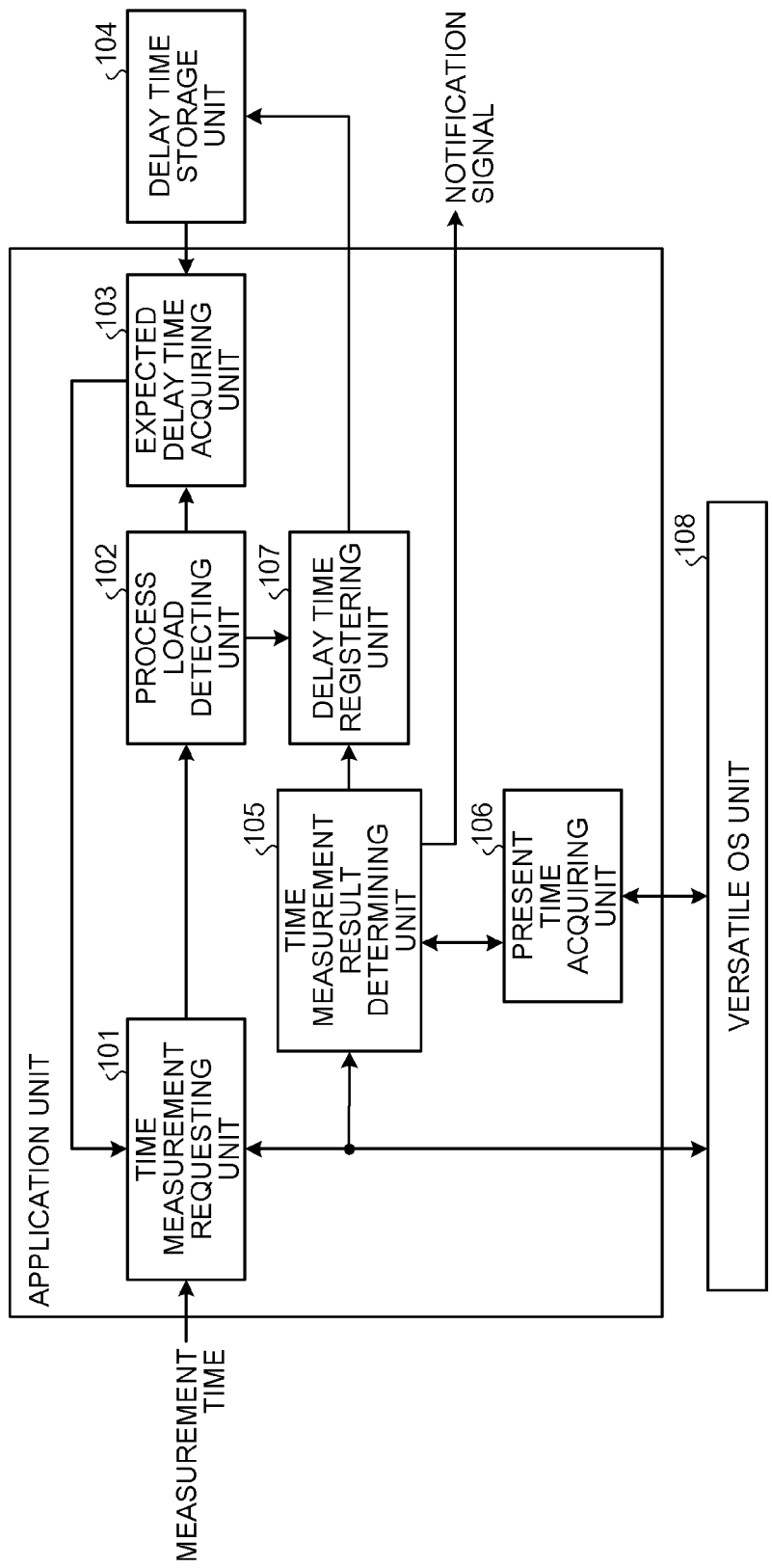
FIG. 2 is a block diagram of the main configuration of an information processing apparatus according to an embodiment of the present invention.

FIG. 2 is a block diagram of the main configuration of an information processing apparatus according to the embodiment of the present invention. The information processing apparatus is, for example, a server or a personal computer, and it can execute various applications. The information processing apparatus represented in FIG. 2 includes a time measurement requesting unit 101, a process load detecting unit 102, an expected delay time acquiring unit 103, a delay time storage unit 104, a time measurement result determining unit 105, a present time acquiring unit 106, a delay time registering unit 107, and a versatile OS unit 108. The processing blocks of these units except the delay time storage unit 104 and the versatile OS unit 108 are included in the application unit.

When a time to be measured (hereinafter, "measurement time") that is desired by the application (not illustrated) is input to the time measurement requesting unit 101, the time measurement requesting unit 101 notifies the process load detecting unit 102 that the desired measurement time is input. Thereafter, the time measurement requesting unit 101 acquires an expected delay time from the expected delay time acquiring unit 103. The time measurement requesting unit 101 subtracts the desired delay time from the desired measurement time. The time measurement requesting unit 101 sets the result of subtraction as a requested measurement time and requests the versatile OS unit 108 to measure the requested measurement time. In other words, the time measurement requesting unit 101 requests the versatile OS unit 108 to measure the requested measurement time that is shorter than the measurement time by expected delay time. If expected delay time is not acquired from the expected delay time acquiring unit 103, the time measurement requesting unit 101 sets 0 as expected delay time and sets the measurement time, which is input, as a requested measurement time.

When requesting the measurement of the requested measurement time, the time measurement requesting unit 101 outputs the measurement time, which is input thereto, and expected delay time to the time measurement result determining unit 105.

When notified that the measurement time is input to the time measurement requesting unit 101, the process load detecting unit 102 detects a process load of the versatile OS unit 108 at the present time. Specifically, the process load detecting unit 102 detects the CPU load, the amount of free memory, and whether writing-out of data from a dirty buffer is performed. If the CPU load is high, it is assumed that the process load of the versatile OS unit 108 is high, which increases the amount of delay of time measurement. Similarly, if the amount of free memory is small, it is assumed that the process load of the versatile OS unit 108 is high, which increases the amount of delay of time measurement. If data from the dirty buffer is written in a disk, it is assumed that the process load of the versatile OS unit 108 is high, which increases the amount of delay of time measurement.

The process load detecting unit 102 outputs the CPU load, the amount of free memory, and the result of whether writing-out of data from the dirty buffer is performed to the expected delay time acquiring unit 103 and the delay time registering unit 107. The process load that the process load detecting unit 102 detects may include conditions other than the CPU load, the amount of free memory, and whether writing-out of data from the dirty buffer is performed.

The expected delay time acquiring unit 103 searches from the delay time storage unit 104 conditions same as those of the process load that is detected by the process load detecting unit 102, and acquires a delay time that is stored in combination with the conditions as an expected delay time. The expected delay time acquiring unit 103 sends the acquired expected delay time to the time measurement requesting unit 101.

If the delay time storage unit 104 does not store therein conditions same as those of the process load that is detected by the process load detecting unit 102, the expected delay time acquiring unit 103 notifies the time measurement requesting unit 101.

The delay time storage unit 104 stores a delay time that occurred when the versatile OS unit 108 previously measured time and the process load corresponding to the delay time in combination. Specifically, as represented in FIG. 3, the delay time storage unit 104 stores conditions (i.e., the CPU load, the amount of free memory, and whether writing-out of data from a dirty buffer is performed) in combination with a delay time that actually occurred. In other words, the delay time storage unit 104 stores therein the conditions of the process load, which is detected by the process load detecting unit 102, and the delay time that previously occurred under the conditions.

When the time measurement requesting unit 101 requests time measurement, the time measurement result determining unit 105 adds the measurement time to the present time to calculate a time at which time measurement is to be completed (hereinafter, "time measurement completion time") which is desired by the application. When the versatile OS unit 108 completes time measurement, the time measurement result determining unit 105 calculates the actual delay time of the time measurement from the expected delay time, the present time, and the time measurement completion time, and notifies the delay time registering unit 107 of the actual delay time. Specifically, the time measurement result determining unit 105 adds a difference between the present time and the time measurement completion time to the expected delay time to calculate the delay time of the current time measurement. If the present time is after the time measurement completion time, the delay time is more than the expected delay time. If the present time is before the time measurement completion time, the delay time is less than expected delay time.

When the versatile OS unit 108 completes time measurement, the time measurement result determining unit 105 compares the present time and the time measurement completion time to determine whether the present time is after the time measurement completion time. If the present time is after the time measurement completion time, the time measurement result determining unit 105 outputs to the application a notification signal that represents that measuring the measurement time that is desired by the application is completed. In contrast, if the present time is before the time measurement completion time, the time measurement result determining unit 105 notifies as a new measurement time the difference between the present time and the time measurement completion time to the time measurement requesting unit 101, and the time measurement requesting unit 101 is caused to measure time until the time measurement completion time.

When the time measurement result determining unit 105 requires the present time, the present time acquiring unit 106 acquires the present time from the versatile OS unit 108 and notifies the time measurement result determining unit 105 of the present time. Specifically, the present time acquiring unit 106 acquires the present time at the time when the time measurement requesting unit 101 requests the versatile OS unit 108 to measure time and at the time when the versatile OS unit 108 completes time measurement, and notifies the time measurement result determining unit 105 of the present time.

The delay time registering unit 107 registers the process load from the process load detecting unit 102 and the delay time from the time measurement result determining unit 105 in combination in the delay time storage unit 104. If the conditions same as those of the process load, which is detected by the process load detecting unit 102, are already registered in the delay time storage unit 104, the delay time registering unit 107 updates the delay time corresponding to the conditions. If the conditions same as those of the process load, which is detected by the process load detecting unit 102, are not registered in the delay time storage unit 104, the delay time registering unit 107 newly registers the conditions and the delay time.

The versatile OS unit 108 executes a versatile OS that is software for operating the information processing apparatus to input/output data or measure time in response to requests from the application. Specifically, the versatile OS unit 108 counts clock pulses from hardware, measures a requested measurement time that is requested by the time measurement requesting unit 101, or notifies the present time acquiring unit 106 of the present time.

Figure 4:
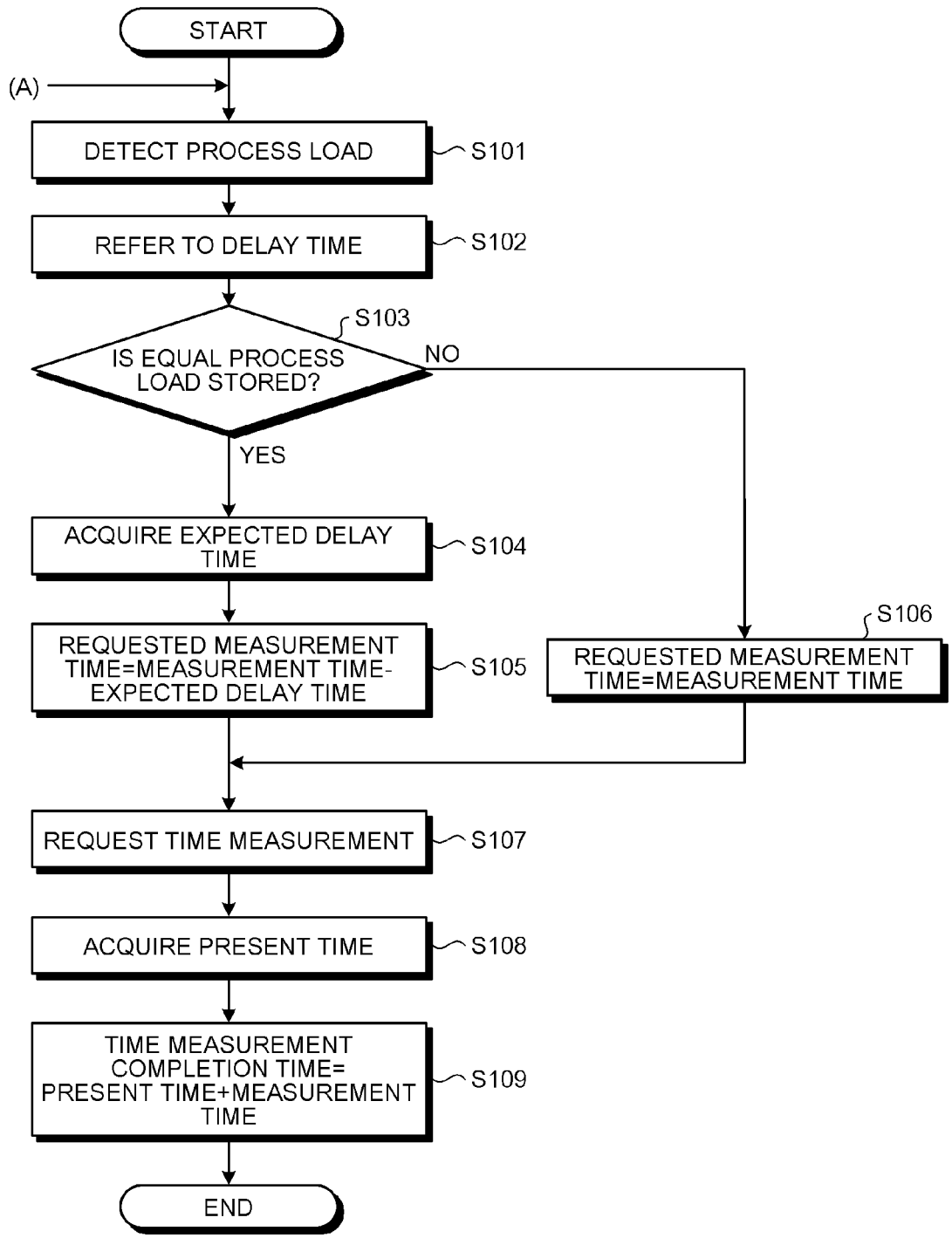
FIG. 4 is a flowchart of operations performed when the information processing apparatus according to the embodiment starts time measurement.

Operations of the information processing apparatus having the above configuration that are performed when time measurement is started will be explained with reference to the flowchart in FIG. 4. The process flow represented in FIG. 4 is performed when the application requests time measurement (the flow starts from "START") or when an insufficient time is measured if time measurement is completed before the time measurement completion time (the flow starts from "(A)").

When a measurement time is input to the time measurement requesting unit 101 from the application or the time measurement result determining unit 105, the time measurement requesting unit 101 notifies the process load detecting unit 102 and the process load detecting unit 102 detects a process load of the versatile OS unit 108 (Step S101). Specifically, the process load detecting unit 102 detects the CPU load, the amount of free memory, and whether writing-out of data from a dirty buffer is performed as conditions that represent the process load of the versatile OS unit 108.

The detected conditions for the process load are output to the expected delay time acquiring unit 103 and the delay time registering unit 107, and the delay time registering unit 107 retains the conditions until time measurement is completed. When the conditions for the process load are output from the process load detecting unit 102, the expected delay time acquiring unit 103 refers to the delay time storage unit 104 (Step S102). Thereafter, the expected delay time acquiring unit 103 determines whether the delay time storage unit 104 stores therein a delay time that matches the conditions for the process load (Step S103). In other words, the expected delay time acquiring unit 103 determines whether the delay time storage unit 104 stores therein a delay time corresponding to conditions same as those detected by the process load detecting unit 102.

If the delay time storage unit 104 stores therein a delay time that matches the conditions (YES at Step S103) the expected delay time acquiring unit 103 acquires as an expected delay time the delay time corresponding to the conditions (Step S104) and the time measurement requesting unit 101 is notified of the expected delay time. The time measurement requesting unit 101 calculates a requested measurement time by subtracting the expected delay time from the measurement time, which is input (Step S105). The requested measurement time is a value obtained in consideration of a delay of time measurement when the process load of the versatile OS unit 108 was previously similar to that of the current time measurement. If a similar delay is caused in the current time measurement, the measurement time, which is input to the time measurement requesting unit 101, elapses at the time when measurement of the requested measurement time is completed.

In contrast, when the delay time storage unit 104 does not store therein the delay time that matches the conditions (NO at Step S103), the expected delay time acquiring unit 103 notifies the time measurement requesting unit 101, the time measurement requesting unit 101 provisionally sets 0 as an expected delay time, and the input measurement time is set as a requested measurement time (Step S106).

After the time measurement requesting unit 101 obtains the requested measurement time as described above, the time measurement requesting unit 101 requests the versatile OS unit 108 to measure the requested measurement time (Step S107). When the time measurement requesting unit 101 notifies the versatile OS unit 108 of the requested measurement time, the input measurement time and the expected delay time are output to the time measurement result determining unit 105 from the time measurement requesting unit 101. Thereafter, in response to a request from the time measurement result determining unit 105, the present time acquiring unit 106 acquires the present time (Step S108). In other words, the present time acquiring unit 106 requests the present time from the versatile OS unit 108. The time measurement result determining unit 105 is notified of the acquired present time at which time measurement is requested.

The time measurement result determining unit 105 calculates a time measurement completion time by adding the measurement time to the present time in order to determine whether the time measurement result and the expected delay time are accurate when time measurement is completed (Step S109). The time measurement completion time is an expected time at which time measurement is completed if the measurement time that is input to the time measurement requesting unit 101 is accurately measured. If the time at which notification of completion of time measurement from the versatile OS unit 108 arrives is same as the time measurement completion time, the time measurement result and the expected delay time are accurate. After calculating the time measurement completion time, the time measurement result determining unit 105 retains the time measurement completion time until time measurement is completed.

In the process flow performed when time measurement is started, after the expected delay time corresponding to the process load of the versatile OS unit 108 is subtracted from the measurement time, the versatile OS unit 108 is requested to measure time. In other words, in the application unit, the requested measurement time is obtained by subtracting the expected delay time from the measurement time that is desired by the application, and the versatile OS unit 108 is requested to measure the requested measurement time. Therefore, it suffices that the versatile OS unit 108 performs a normal time measurement process without consideration for any process delay, and modifying the versatile OS is unnecessary.

At the time when the process flow performed when the time measurement is started is completed, the time measurement result determining unit 105 retains the time measurement completion time at which time measurement is to be completed and the delay time registering unit 107 retains the process load of the versatile OS unit 108 at the time when time measurement is requested. The time measurement completion time and the process load are used when time measurement is completed.

Figure 5:
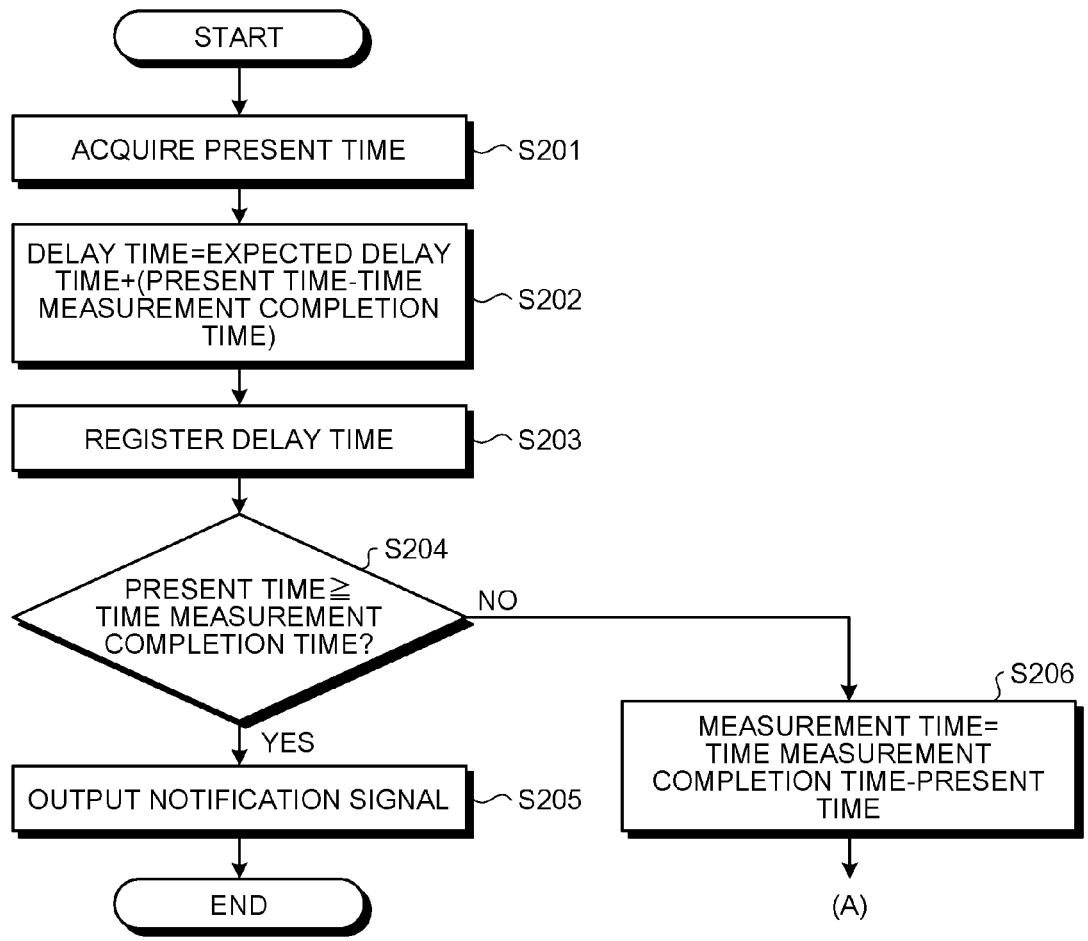
FIG. 5 is a flowchart of operations performed when the information processing apparatus according to the first embodiment completes time measurement.

Operations of the information processing apparatuses according to the embodiment that are performed when time measurement is completed will be explained with reference to the flowchart represented in FIG. 5.

When time measurement is completed, the versatile OS unit 108 notifies the time measurement result determining unit 105 that time measurement is completed and the present time acquiring unit 106 acquires the present time in response to a request from the time measurement result determining unit 105 (Step S201). In other words, the present time acquiring unit 106 requests the present time from the versatile OS unit 108 and the time measurement result determining unit 105 is then notified of the acquired present time at which time measurement is completed.

The time measurement result determining unit 105 corrects the expected delay time that is output from the time measurement requesting unit 101 when time measurement is requested. Specifically, the time measurement result determining unit 105 adds the difference between the present time and the time measurement completion time to the expected delay time to calculate the delay time of the current time measurement (Step S202). In the embodiment, when time measurement is started, the versatile OS unit 108 is requested to measure the requested measurement time that is obtained by subtracting the expected delay time from the measurement time. Therefore, if the expected delay time is accurate, the present time should be same as the time measurement completion time that is calculated when time measurement is started. In this case, a delay equivalent to the expected delay time occurs in the current time measurement by the versatile OS unit 108, and the delay time is equal to the expected delay time.

If the expected delay time is less than the actual delay time, the present time should be after the time measurement completion time. In this case, the delay time is more than the expected delay time by the difference between the present time and the time measurement completion time. If the expected delay time is more than the actual delay time, the present time should be before the time measurement completion time. In this case, the delay time is less than the expected delay time by the difference between the present time and the time measurement completion time.

The delay time of the current time measurement, which is calculated as described above, is registered in combination with the conditions of the process load in the delay time storage unit 104 by the delay time registering unit 107 (Step S203). If the conditions of the process load are not registered in the delay time storage unit 104, the delay time registering unit 107 newly registers the conditions of the process load and the delay time. If the conditions of the process load are already registered in the delay time storage unit 104, the delay time registering unit 107 updates the delay time corresponding to the conditions of the process load.

When the conditions for the process load of the current time measurement relative to the contents of the delay time storage unit 104 represented in FIG. 3 are, for example, "CPU LOAD: 100%, AMOUNT OF FREE MEMORY: 0MB, and WRITING-OUT OF DATA FROM BUFFER: YES", the conditions and the delay time "1.7 µs" that corresponds to the conditions are newly registered in the delay time storage unit 104 as represented by the bold line in FIG. 6 because the conditions are not registered in the delay time storage unit 104. If the conditions of the process load of the current time measurement are "CPU LOAD: 97%, AMOUNT OF FREE MEMORY: 0MB, and WRITING-OUT OF DATA FROM BUFFER: YES", only the delay time that corresponds to the conditions is updated to "1.3 µs" as represented by the bold line in FIG. 7 because the conditions are already registered in the delay time storage unit 104.

As described above, in the embodiment, the process load of the versatile OS unit 108 and the delay time corresponding to the process load are constantly updated to the latest ones, and the delay time is used as an expected delay time corresponding to a process load of the next or subsequent time measurement. Therefore, the delay time in the case where the processing status of the versatile OS unit 108 is closer to the status at the time when time measurement is requested can be set as an expected delay time, so that time measurement can be accurately performed. The more the time measurement is repeated, the more the number of combinations of conditions for process loads and delay times that are registered in the delay time storage unit 104 increases. This increases the possibility that there is a delay time that matches conditions of a process load at the time when time measurement is requested, and accordingly, the possibility that the requested measurement time obtained by subtracting an appropriate expected delay time can be calculated at the time when time measurement is requested.

At the same time when the delay time is registered in the delay time storage unit 104, the time measurement result determining unit 105 compares the present time and the time measurement completion time, which is calculated when time measurement is started (Step S204). If the present time is after the time measurement completion time (YES at Step S204), the time measurement result determining unit 105 outputs a notification signal representing that the measurement time has passed because more than the measurement time has elapsed since the measurement time was input to the time measurement requesting unit 101 (Step S205). In the embodiment, the versatile OS unit 108 is requested to measure the requested measurement time obtained by subtracting the expected delay time corresponding to the process load from the measurement time when time measurement is requested. Thus, the present time at which time measurement is completed and the time measurement completion time, which is calculated when time measurement is started, are approximately the same, so that time measurement can be accurately performed. Therefore, the notification signal that is output from the time measurement result determining unit 105 accurately notifies the application of the measurement time that is desired by the application.

In contrast, if the present time at which time measurement is completed is before the time measurement completion time, which is calculated when time measurement is started, when the present time and time measurement completion time are compared with each other (NO at Step S204), the time measurement result determining unit 105 calculates an insufficient measurement time because the measurement time has not elapsed since the measurement time was input to the time measurement requesting unit 101. In other words, the time measurement result determining unit 105 calculates an insufficient measurement time by subtracting the present time from the time measurement completion time (Step S206), and the calculated measurement time is output to the time measurement requesting unit 101. When the insufficient measurement time is input to the time measurement requesting unit 101, the process represented in FIG. 4 and performed at the time when time measurement is started is performed again to start measuring the insufficient measurement time. Time measurement is repeated until the present time at which time measurement is completed comes after the time measurement completion time, which is calculated when time measurement is started.

Thus, even if an expected delay time corresponding to a process load is excessively long, the time measurement result determining unit 105 outputs a notification signal representing that time measurement is completed after the measurement time that is desired by the application elapses, so that accurate time measurement can be performed.

As described above, in the embodiment, the application beforehand subtracts the expected delay time corresponding to the process load of the versatile OS at the time when time measurement is requested from the measurement time to obtain the, and requests the versatile OS to measure the requested measurement time. After the versatile OS measures time, the actual delay time is calculated and stored, so that the delay time can be used as an expected delay time in the next or subsequent time measurement. Therefore, without special processing by the versatile OS, the delay time that is expected from the previous process loads and the tendency of delay time is subtracted beforehand from the measurement time, and the versatile OS is requested to measure the time obtained by the subtraction. Accordingly, it is possible to accurately perform time measurement while inhibiting a cost increase without modifying the versatile OS.

In the embodiment, if the delay time storage unit 104 does not store therein conditions completely same as those of the process load that is detected by the process load detecting unit 102, the expected delay time is set to 0. Alternatively, the expected delay time acquiring unit 103 may determine an expected delay time from a part of the conditions representing the process load by interpolation. In other words, for example, if the delay time corresponding to conditions that include a CPU load different from that of the process load detected by the process load detecting unit 102 is stored in the delay time storage unit 104, the expected delay time acquiring unit 103 may estimate an expected delay time based on the difference in CPU load from the delay time that is stored in the delay time storage unit 104.

In the embodiment, the actual delay time is obtained and the actual delay time is registered in the delay time storage unit 104. Alternatively, when the delay time already stored in the delay time is updated, an average between the already stored delay time and a new delay time may be stored instead of completely deleting the stored delay time. In this case, a large weight coefficient may be used for the new delay time.

In the embodiment, the conditions that highly correlate to the delay time of the time measurement process can be assuredly detected and the detected conditions are compared with the stored conditions, so that an accurate expected delay time can be obtained.

In the embodiment, after time measurement is completed, the delay time corresponding to the detected process load can be easily calculated and newly stored in the memory.

In the embodiment, even if a delay time completely matches the detected process load is not stored in the memory, an appropriate expected delay time can be acquired.

In the embodiment, each time when time measurement is repeated, combinations of process load and delay time are updated, so that expected delay times to be used in the next or subsequent time measurement can be accurate.

In the embodiment, if the time at which time measurement is actually completed is after the calculated time measurement completion time, the expected delay time can be corrected longer. If the time at which time measurement is actually completed is before the calculated time measurement completion time, the expected delay time can be corrected shorter. Accordingly, expected delay times to be used in the next or subsequent time measurement may be accurate.

In the embodiment, the delay time corresponding to a process load that is already stored can be updated to the latest one.

The more time measurement is repeated, the more the possibility that a delay time corresponding to a process load to be detected is already stored increases. This increases the possibility that an expected delay time corresponding to the process load is obtained.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
    a storage unit that stores a process load of a versatile Operating System (OS) that performs a time measurement process in response to a request from an application, and a delay time of the time measurement process in combination;
    a detecting unit that detects a process load of the versatile OS when the application requests the time measurement process;
    an acquiring unit that acquires a delay time that corresponds to the process load, which is detected by the detecting unit, as an expected delay time from the storage unit; and
    a requesting unit that subtracts the expected delay time acquired by the acquiring unit from a measurement time that is requested by the application to obtain a requested measurement time, and requests the versatile OS to measure the requested measurement time.

2. The information processing apparatus according to claim 1, wherein the detecting unit detects, as a condition corresponding to the process load of the versatile OS, a Central Processing Unit (CPU) load, an amount of free memory, or whether writing-out of data from dirty buffer is performed.

3. The information processing apparatus according to claim 1, wherein the acquiring unit sets the expected delay time to zero (0) when the storage unit does not store therein the delay time corresponding to the process load, which is detected by the detecting unit.

4. The information processing apparatus according to claim 1, wherein the acquiring unit estimates the delay time corresponding to the process load, which is detected by the detecting unit, using the process load, which is detected by the detecting unit, and the process load and the delay time, which are stored in the storage unit.

5. The information processing apparatus according to claim 1, further comprising:
    a calculating unit that calculates the delay time of the time measurement process of the versatile OS when the time measurement that the versatile OS is requested by the requesting unit to perform is completed; and
    a registering unit that registers in the storage unit the delay time, which is calculated by the calculating unit, in combination with the process load, which is detected by the detecting unit.

6. The information processing apparatus according to claim 5, wherein
    the calculating unit obtains a time measurement completion time by adding the measurement time, which is requested by the application, to a time at which the requesting unit requests the versatile OS to measure time, and the calculating unit calculates the delay time by adding a difference between a time measurement completion time and a time at which the time measurement that the versatile OS is requested to perform by the requesting unit is completed to the expected delay time, which is acquired by the acquiring unit.

7. The information processing apparatus according to claim 5, wherein when the process load, which is detected by the detecting unit, is already registered in the storage unit, the registering unit updates the delay time corresponding to the process load.

8. The information processing apparatus according to claim 5, wherein when the process load, which is detected by the detecting unit, is not registered in the storage unit, the registering unit newly registers the process load in combination with the delay time, which is calculated by the calculating unit, in the storage unit.

9. A time measurement method performed by an information processing apparatus that includes a versatile OS that performs a time measurement process in response to a request from an application, the time measurement method comprising:

detecting, using a processor, a process load of the versatile OS when the application requests the time measurement process;

acquiring, using the processor, a delay time that corresponds to the detected process load as an expected delay time from a memory that stores therein a previous process load of the versatile OS in combination with a previous delay time of a time measurement process;

subtracting, using the processor, the expected delay time from a measurement time that is requested by the application to obtain a requested measurement time; and requesting, using the processor, the versatile OS to measure the requested measurement time.

10. The time measurement method according to claim 9, wherein, in the detecting, a Central Processing Unit (CPU) load, an amount of free memory, or whether writing-out of data from dirty buffer is performed is detected as a condition corresponding to the process load of the versatile OS.

11. The time measurement method according to claim 9, wherein, in the acquiring, the expected delay time is set to zero (0) when the memory does not store therein the delay time corresponding to the process load, which is detected at the detecting.

12. The time measurement method according to claim 9, wherein, in the acquiring, the delay time corresponding to the process load, which is detected at the detecting, is estimated using the process load, which is detected at the detecting, and the process load and the delay time, which are stored in the memory.

13. The time measurement method according to claim 9, further comprising calculating, using the processor, the delay time of the time measurement process of the versatile OS when the time measurement that the versatile OS is requested at the requesting is completed; and registering in the memory, using the processor, the delay time, which is calculated at the calculating, in combination with the process load, which is detected at the detecting.

14. The time measurement method according to claim 13, wherein, in the calculating, the delay time is calculated by adding a difference between a time measurement completion time and a time at which the time measurement that the versatile OS is requested to perform at the requesting is completed to the expected delay time, which is acquired at the acquiring, the time measurement completion time being obtained by adding the measurement time, which is requested by the application, to a time at which the versatile OS is requested to perform the time measurement at the requesting.

15. The time measurement method according to claim 13, wherein, in the registering, when the process load, which is detected at the detecting, is already registered in the memory, the delay time corresponding to the process load is updated.

16. The time measurement method according to claim 13, wherein, in the registering, the process load, which is detected at the detecting, is newly registered in the memory in combination with the delay time, which is calculated at the calculating, when the process load, which is detected at the detecting, is not registered in the memory.

17. A non-transitory computer readable storage medium containing instructions for time measurement that, when executed by a computer that includes a versatile OS that performs a time measurement process in response to a request from an application, causes the computer to perform:

detecting a process load of the versatile OS when the application requests the time measurement process;

acquiring a delay time that corresponds to the detected process load as an expected delay time from a memory that stores therein a previous process load of the versatile OS in combination with a previous delay time of a time measurement process;

subtracting the expected delay time from a measurement time that is requested by the application to obtain a requested measurement time; and requesting the versatile OS to measure the requested measurement time.

18. The non-transitory computer readable storage medium according to claim 17, wherein, in the detecting, a Central Processing Unit (CPU) load, an amount of free memory, or whether writing-out of data from dirty buffer is performed is detected as a condition corresponding to the process load of the versatile OS.

19. The non-transitory computer readable storage medium according to claim 17, wherein, in the acquiring, the expected delay time is set to zero (0) when the memory does not store therein the delay time corresponding to the process load, which is detected at the detecting.

20. The non-transitory computer readable storage medium according to claim 17, wherein, in the acquiring, the delay time corresponding to the process load, which is detected at the detecting, is estimated using the process load, which is detected at the detecting, and the process load and the delay time, which are stored in the memory.

* * * * *